United States Patent [19]

Futagawa

[11] Patent Number: 4,626,945
[45] Date of Patent: Dec. 2, 1986

[54] MAGNETIC HEAD

[76] Inventor: Toshinobu Futagawa, 3-3-23, Nishishinjunku,, Shinjuku-ku, Tokyo, Japan

[21] Appl. No.: 620,184

[22] Filed: Jun. 13, 1984

[30] Foreign Application Priority Data

Jun. 18, 1983 [JP] Japan .................. 58-109909
Aug. 25, 1983 [JP] Japan .................. 58-155645

[51] Int. Cl.⁴ .......................................... G11B 5/127
[52] U.S. Cl. ................................ 360/110; 360/125
[58] Field of Search ................ 360/121-125, 360/110

[56] References Cited

U.S. PATENT DOCUMENTS

| | | | |
|---|---|---|---|
| 2,835,743 | 5/1958 | Muffley | 360/123 X |
| 2,901,549 | 8/1959 | Serrell | 360/123 X |
| 3,224,074 | 12/1965 | Peters | 360/125 |
| 3,307,163 | 2/1967 | Rabinow | 360/125 X |
| 3,516,152 | 6/1970 | Austen | 360/125 X |
| 3,713,122 | 1/1973 | Taylor | 340/174.1 F |

FOREIGN PATENT DOCUMENTS 1499763 5/1970 Fed. Rep. of Germany .
2407633 9/1974 Fed. Rep. of Germany .
1525007 9/1978 United Kingdom .

Primary Examiner—John H. Wolff
Attorney, Agent, or Firm—Wolf, Greenfield & Sacks

[57] ABSTRACT

A magnetic head comprising a head body provided at its outer peripheral surface with a plurality of annular grooves, a plurality of magnetic elements connected to the corresponding peripheral surface portions positioned between the adjacent grooves, one or more magnetic exciters, and a switching circuit for selectively connecting any pair of the two adjacent magnetic elements to the magnetic exciter. The head body of the magnetic head may comprise nonmagnetic body on which a plurality of magnetic areas disposed so that on the outer surface of the head body the magnetic areas and nonmagnetic areas are positioned alternately.

7 Claims, 10 Drawing Figures

MAGNETIC HEAD

BACKGROUND OF THE INVENTION

The present invention relates to a magnetic head, and more particularly it relates to a magnetic head comprising a single head body having a plurality of magnetizing means thereon.

Generally, a conventional magnetic head comprises an iron core and a coil positioned around the core. Such magnetic head can be used for recording information on a magnetizable medium such as a magnetic tape or a floppy disc. Recently, since a vertical magnetizing system has been proposed and floppy discs have been remarkably developed, high density magnetic recording is required. For example, in a recent floppy disc, a distance between two adjacent recording tracks on the disc is extremely narrow. For example, such distance is 1/48 inch (about 0.529 mm) or less than 1/48 inch. When the magnetic recording operation is performed with respect to such floppy disc by using the abovementioned conventional magnetic head, the magnetic head must be positioned on or above the desired recording track on the disc. Conventionally, the positioning of the magnetic head was effected by shifting the head in a radial direction of the disc by means of a feed mechanism including a lead screw. However, due to a dimensional error in the manufacture of the lead screw, an error in the mounting and adjusting of the magnetic head and because of the extremely narrow distance between the tracks, in the positioning of the head with respect to the recording track, a so-called "off-track" phenomenon will occur, which results in inaccurate recording. Further, there was a problem that the head will bound on the floppy disc.

An object of the present invention is to provide a magnetic head which eliminates the above drawbacks and has a simple construction.

SUMMARY OF THE INVENTION

According to a preferred embodiment of the present invention, the magnetic head of the invention comprises a head body of magnetic material provided at its peripheral surface with a series of annular grooves, a plurality of magnetic elements each connected to the corresponding peripheral surface portion (of the head body) comprised between the two adjacent annular grooves, one or more magnetic exciting means, and means for magnetically connecting said exciting means to any pair of the two adjacent magnetic elements.

According to another embodiment of the invention, the magnetic head comprises a head body having a peripheral surface on which nonmagnetic areas and magnetic areas are alternately disposed, a plurality of magnetic elements each connected to the corresponding magnetic area, one or more magnetic exciting means, and means for magnetically connecting said exciting means to any pair of the two adjacent magnetic elements.

DETAILED DESCRIPTION OF THE PREFERRED EMBODIMENTS

Figure 1:
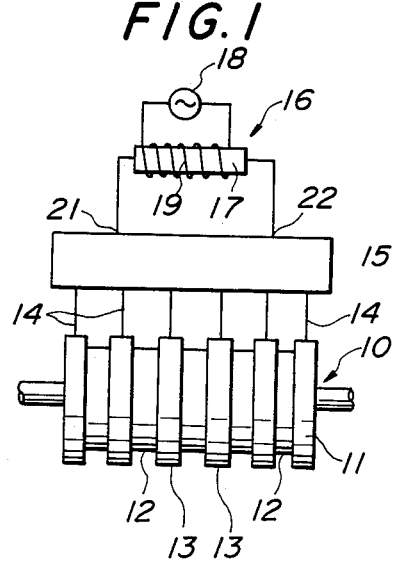
FIG. 1 is an elevational view of a magnetic head according to an embodiment of the present invention.

With reference to the drawings, the magnetic head 10 according to a preferred embodiment of the present invention (FIG. 1) comprises a cylindrical head body 11 of magnetic material. A plurality of annular grooves 12 are formed on an outer cylindrical surface of the head body at predetermined intervals. Peripheral surface portions 13 of the body comprised between the two adjacent grooves 12 are connected to corresponding magnetic members or elements 14. When the magnetic head is rotary type, the magnetic elements 14 can be magnetically connected to the surface portions 13 through the medium of appropriate contact brush means (not shown).

Each magnetic element 14 is magnetically connected to a magnetic exciting means 16 by means of an appropriate conventional switching circuit 15. The magnetic exciting means 16 is of already known type and comprises an iron core 17, and a coil 19 wound around the core and connected to a current source 18. The switching circuit 15 may comprise a switching circuit of analogue type which can be controlled by an appropriate pulse counter (not shown) to selectively and magnetically connect any pair of two adjacent magnetic elements 14 to magnetic pole terminals 21 and 22 of the core 17.

Figure 2:
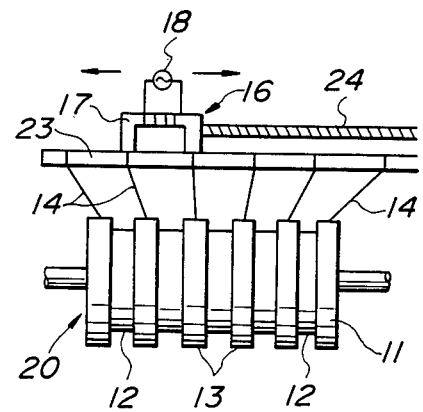
FIG. 2 is an elevational view of a magnetic head according to a second embodiment of the present invention.

FIG. 2 shows the magnetic head 20 according to a second embodiment of the present invention. In this magnetic head 20, the peripheral surface portions 13 of the head body 11 comprised between the adjacent grooves 12 are connected to the corresponding magnetic elements 14. However, in this second embodiment, in place of the switching circuit 15, a slidable magnetic exciting means 16 is used. More particularly, the slidable magnetic exciting means 16 (FIG. 2) includes a support 23, as well as the above-mentioned iron core 17, coil 19 and current source 18. In this case, the other ends of the magnetic elements 14 are held by the support 23 so that the other ends of the elements 14 are spaced apart from each other at predetermined intervals larger than the intervals between the lower ends of the elements 14 which are connected to the corresponding surface portions 13. A distance between the pole terminals of the core 17 corresponds to the distance between the ends of the magnetic elements 14 on the support 23. A feeding device including a lead screw 24 is provided for sliding the core 17 on the support 23 in the directions indicated by arrows to connect the pole terminals of the core to any one pair of the two adjacent magnetic elements 14. An advantage obtained by the second embodiment is that even if the distance between the grooves 12 of the head body 11 is very small to permit the magnetic recording on the high density recording tracks of the floppy disc, there is no danger of "off-track" due to dimensional error of the lead screw, since the distance between the upper ends of the magnetic elements 14 is relatively large.

Figure 3:
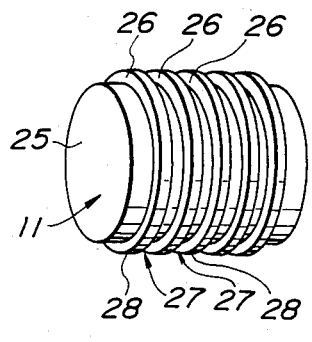
FIG. 3 shows a modification of a head body of the magnetic head as a perspective view.

The head body 11 of FIGS. 1 and 2 is preferably formed by cutting the grooves 12 on the cylindrical surface of a cylindrical body. However, as shown in FIG. 3, the head body 11 can be constituted by fitting a plurality of magnetic rings 26 on a central core 25 at predetermined intervals. In this case, gaps 27 formed between the rings 26 correspond to the grooves 12 of FIGS. 1 and 2, and outer cylindrical surfaces 28 of the rings 26 correspond to the surface portions 13 of FIGS. 1 and 2.

Figure 4:
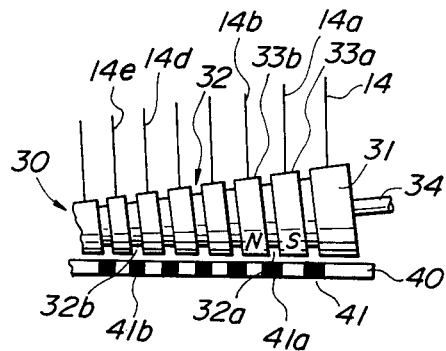
FIG. 4 is a partial elevational view of a magnetic head according to a third embodiment of the present invention, in which a portion of a floppy disc associated with the magnetic head is also illustrated.

FIG. 4 shows the magnetic head 30 according to a third embodiment of the invention. The magnetic head 30 has a frusto-conical head body 31 provided at its peripheral surface with a plurality of annular grooves 32 at predetermined intervals. Outer surface portions 33 of the body 31 are connected to corresponding magnetic elements 14. It should be noted that, although not shown in FIG. 4, the magnetic head 30 includes switching circuit 15 and magnetic exciting means 16 similar to those of FIG. 1.

Figure 5:
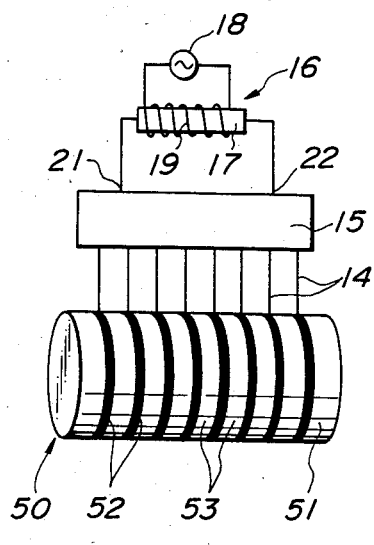
FIG. 5 is a perspective view of a magnetic head according to a fourth embodiment of the present invention.

FIG. 5 shows the magnetic head 50 according to a fourth embodiment of the invention. The magnetic head 50 comprises a cylindrical head body 51 of nonmagnetic material. A plurality of annular magnetic layers (magnetic areas) 52 are disposed on a cylindrical surface of the body 51 at predetermined intervals. Accordingly, on the outer surface of the head body 51, the magnetic areas 52 and nonmagnetic areas 53 (constituted by the outer surface of the body itself) are positioned alternately. Similar to the magnetic head 10 of FIG. 1, the magnetic head 50 also includes the magnetic elements 14, switching circuit 15, and magnetic exciting means 16. Each magnetic area 52 is connected to the corresponding magnetic element 14.

Figure 6:
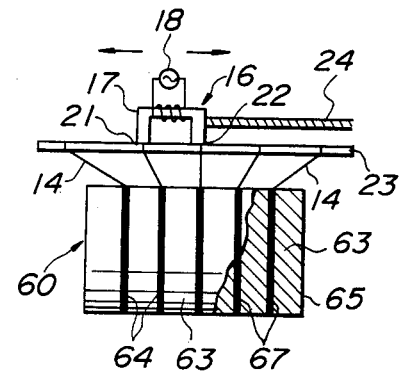
FIG. 6 is an elevational view showing a magnetic head according to a fifth embodiment of the present invention.

FIG. 6 shows the magnetic head 60 according to a fifth embodiment of the invention similar to the embodiment of FIG. 2. The magnetic head 60 of FIG. 6 is the same as that of FIG. 2, except that the magnetic head 60 (FIG. 6) comprises a head body 65 constituted by superposing non-magnetic discs 63 and magnetic discs 64 alternately, and each magnetic disc 64 is magnetically connected to the corresponding magnetic element 14.

Figure 7:
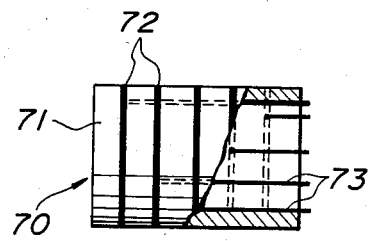
FIG. 7 shows a modification of the head body of the magnetic head as an elevational view in partial section.

FIG. 7 shows a modification of the head body 70 similar to that of FIG. 5. The head body 70 comprises a hollow cylindrical body 71 of nonmagnetic material on which a plurality of magnetic areas 72 are disposed at predetermined intervals. In this case, magnetic elements 73 (corresponding to the magnetic elements 14) are arranged on an inner surface of the body 71 and are connected to the corresponding magnetic areas 72 through the wall of the body.

Figure 8:
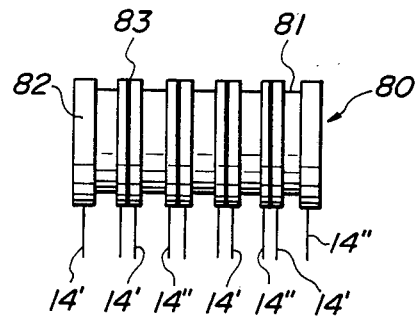
FIG. 8 is a partial elevational view of a magnetic head according to a sixth embodiment of the present invention.

FIG. 8 shows the magnetic head 80 according to a sixth embodiment of the invention. The magnetic head 80 comprises a head body constituted by a plurality of nonmagnetic discs 83 and a plurality of magnetic discs 82 each provided with an annular groove 81 which discs 83 and 82 are alternately superposed. A pair of outer surface portions positioned on both sides of the groove 81 of the magnetic disc 82 is connected to a corresponding pair of magnetic elements 14' and 14". In this case, when the pair of magnetic elements 14' and 14" are magnetically connected to the magnetic pole terminals 21 and 22 through the medium of the switching circuit 15, opposite magnetic poles (N and S) are generated on both sides of the groove 81.

Figure 9:
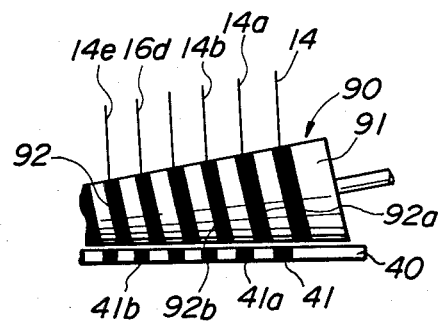
FIG. 9 is a partial elevational view of a magnetic head according to a seventh embodiment of the present invention, in which a portion of a floppy disc associated with the magnetic head is also illustrated.

FIG. 9 shows the magnetic head 90 according to a seventh embodiment of the invention. The magnetic head 90 comprises a frusto-conical head body 91. A plurality of magnetic areas 92 are disposed on an outer cylindrical surface of the head body at predetermined intervals. These magnetic areas 92 are magnetically connected to corresponding magnetic elements 14. It should be noted that, although not shown in FIG. 9, the magnetic head 90 includes switching circuit and magnetic exciting means similar to those of FIG. 1.

Figure 10:
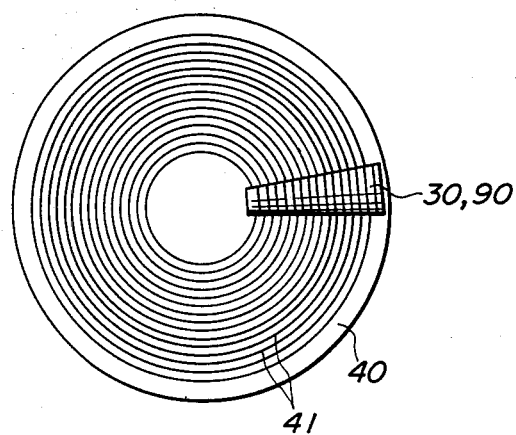
FIG. 10 is a plan view showing a relationship between the magnetic head and the floppy disc associated therewith.

The operation of the magnetic head of the present invention will now be explained, as an example, with reference to the embodiment of FIG. 4. In this example, a desired information is recorded on or reproduced from a floppy disc 40 (FIGS. 4 and 10) by means of the magnetic head 30 of FIG. 4. As already stated, the magnetic head 30 comprises the frusto-conical head body 31 of magnetic material provided at its outer surface with the grooves 32. The distance between the adjacent grooves is so selected that said distance corresponds to the distance between the adjacent recording tracks 41 on the floppy disc 40. Accordingly, when the magnetic head 30 is properly positioned with respect to the floppy disc 40, the grooves 32 will be exactly aligned with the corresponding tracks 41.

At the biginning of the recording cycle, the magnetic head 30 is properly positioned on or above the floppy disc 40 by an appropriate means such as a feeding device (not shown) in such a way that the grooves 32 of the head are aligned with the corresponding track 41 of the floppy disc. When the head is slightly apart from the disc, the head is held stationary. Now, if the magnetic recording is effected on the recording track 41a (FIG. 4), the magnetic elements 14a and 14b connected to the outer surface portions 33a and 33b positioned on both sides of the groove 32a corresponding to said recording track 41a are connected to the magnetic exciting means 16 (FIG. 1) by means of the switching circuit 5. As a result, opposite magnetic poles (N and S) are generated on both sides of the groove 32a, thereby permitting the recording of the information on the recording track 41a of the floppy disc 40. Next, if it is desired to record information on the recording track 41b of the floppy disc 40, by appropriately switching over the switching circuit 15, the magnetic elements 14d and 14e connected to the outer surface portions positioned on both sides of the groove 32b corresponding to said recording track 41b are connected to the magnetic exciting means 16, thereby permitting the recording of the information on the track 41b of the floppy disc 40. In this way, the recording operation can be effected with respect to any recording track of the floppy disc. When the magnetic head is positioned in contact with the floppy disc, the head is rotatably supported by means of an appropriate supporting means (not shown) so that the head can be rotated around its central axis 34 as the floppy disc 40 is rotated. Further, an inclination of the conical surface of the head body 31 is so selected that the peripheral speed of the head 30 is equal to the rotational speed of the floppy disc 40.

Lastly, the operation of the magnetic head of the present invention will be further explained, as a second example, with reference to the embodiment of FIG. 9. In this example, the distance between the adjacent magnetic areas 92 on the outer surface of the magnetic head 90 of FIG. 9 is so selected that said distance corresponds to the distance between the adjacent recording tracks 41 (FIG. 9) of the floppy disc 40. Accordingly, when the magnetic head 90 is properly positioned with respect to the floppy disc, the outer surface portions of the head (nonmagnetic areas) between the adjacent magnetic areas 92 will be aligned with the corresponding tracks 41.

After the magnetic head 90 has been properly positioned on the floppy disc 40 in the manner similar to that of the aforementioned example, for example, the magnetic elements 14a and 14b connected to the pair of magnetic areas 92a and 92b on both sides of the recording track 41a of the floppy disc are connected to the magnetic exciting means 16 (FIG. 1) by means of the switching circuit 15, thereby permitting the recording of the information on the recording track 41a. If it is desired to record information on the track 41b (FIG. 9), by appropriately switching over the switching circuit 15, the magnetic elements 14d and 14e connected to the magnetic areas positioned on both sides of said track 41b are connected to the magnetic exciting means 16.

It is apparent that the magnetic head of the present invention does not cause the "off-track", since once the head is positioned on the floppy disc the head does not shift in the radial direction of the floppy disc.

It should be noted that the magnetic head of the present invention can apply for recording on any magnetic tapes.

This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A rotary magnetic head, characterized by comprising a head body of magnetic material rotatable around the axis thereof which head body is provided on its peripheral surface with a plurality of complete annular grooves, a plurality of magnetic elements which touch corresponding continuous peripheral surface portions positioned between two adjacent grooves, one or more magnetic exciting means, and means for selectively and magnetically connecting any pair of the two adjacent magnetic elements to said magnetic exciting means, whereby each of said two adjacent peripheral surface portions connected to said magnetic exciting means provides opposed magnetic poles respectively at the opposite portions of said two peripheral surface portions.

2. A magnetic head according to claim 1, characterized in that the magnetic exciting means is of slidable type.

3. A magnetic head according to claim 1, characterized in that said head body is frusto-conical shape.

4. A rotary magnetic head, characterized by comprising a head body of nonmagnetic material rotatable around the axis thereof, a plurality of continuous annular magnetic areas disposed on an outer surface of said head body, a plurality of magnetic elements which touch the corresponding magnetic areas, one or more magnetic exciting means, and means for selectively and magnetically connecting any pair of adjacent magnetic elements to said magnetic exciting means, whereby each of said two adjacent magnetic areas connected to said magnetic exciting means provides opposed poles respectively at the opposite portions of said two magnetic areas.

5. A magnetic head according to claim 4, characterized in that said head body is constituted by superposing the magnetic discs and nonmagnetic discs alternately.

6. A magnetic head according to claim 4, characterized in that said head body is frusto-conical shape.

7. A magnetic head according to claim 4, characterized in that said magnetic exciting means is of slidable type.

* * * * *